US012624773B2

(12) United States Patent
Tanabe et al.

(10) Patent No.: US 12,624,773 B2
(45) Date of Patent: May 12, 2026

(54) WIRELESS OPENING METER, VALVE MAINTENANCE SUPPORT SYSTEM AND SUPPORT METHOD

(71) Applicant: Azbil Corporation, Tokyo (JP)

(72) Inventors: Itsuki Tanabe, Tokyo (JP); Fumiaki Yamasaki, Tokyo (JP); Masato Tanaka, Tokyo (JP)

(73) Assignee: Azbil Corporation, Tokyo (JP)

( * ) Notice: Subject to any disclaimer, the term of this patent is extended or adjusted under 35 U.S.C. 154(b) by 47 days.

(21) Appl. No.: 18/967,645

(22) Filed: Dec. 4, 2024

(65) Prior Publication Data

US 2025/0257814 A1     Aug. 14, 2025

(30) Foreign Application Priority Data

Feb. 13, 2024     (JP) .................................. 2024-019454

(51) Int. Cl.
    *F16K 37/00*        (2006.01)
    *H04W 4/38*        (2018.01)

(52) U.S. Cl.
    CPC ........... *F16K 37/0075* (2013.01); *H04W 4/38* (2018.02)

(58) Field of Classification Search
    CPC ............. F16K 37/0075; F16K 37/0041; F16K 37/0083; F16K 37/0091; H04W 4/38; G01M 13/003; G01M 13/005; G08C 17/02
See application file for complete search history.

(56) References Cited

U.S. PATENT DOCUMENTS

| | | | | | |
|---|---|---|---|---|---|
| 8,356,431 B2 * | 1/2013 | Pratt, Jr. | ............... | H04W 84/18 |
| | | | | 370/512 |
| 2024/0167583 A1 * | 5/2024 | Jelken | ................. | F16K 37/0083 |

FOREIGN PATENT DOCUMENTS

| | | |
|---|---|---|
| JP | 3254624 | 2/2002 |
| JP | 2015114942 | 6/2015 |
| JP | 2015114943 | 6/2015 |

* cited by examiner

*Primary Examiner* — Omeed Alizada
(74) *Attorney, Agent, or Firm* — JCIPRNET

(57) ABSTRACT

A wireless opening meter includes measurement portions that measures an opening, a pneumatic pressure supplied to an operation device, and a temperature at an outlet side of the control valve; a failure diagnosis portion that calculates an index of a change leading to a failure of the valve based on a measurement value, and executes failure diagnosis of the valve based on the index; a wireless communication portion that wirelessly transmits the index and a result of the failure diagnosis to a valve maintenance support device; and an adjustment portion that compares the index with a predetermined index determination threshold, and in response to determining that a progression degree towards a failure of the valve is small, perform thinning processing of an operation time of the wireless opening meter by extending an operation cycle of the wireless opening meter to be longer than an initial value.

13 Claims, 13 Drawing Sheets

WIRELESS OPENING METER, VALVE MAINTENANCE SUPPORT SYSTEM AND SUPPORT METHOD

CROSS-REFERENCE TO RELATED APPLICATION

This application claims the priority benefits of Japanese application No. 2024-019454, filed on Feb. 13, 2024. The entirety of the above-mentioned patent application is hereby incorporated by reference herein and made a part of this specification.

BACKGROUND

Technical Field

The disclosure relates to a technology for supporting maintenance work, and specifically to a wireless opening meter, a valve maintenance support system, and a support method for implementing efficient work support for valve maintenance.

Description of Related Art

Valves (e.g., the control valve in FIG. 15) used in petrochemical plants and the like require particular attention to safety, and therefore undergo periodic maintenance. The control valve shown in FIG. 15 includes a valve main body 100 that opens and closes a passage through which fluid flows, a positioner 101 that converts an input electrical signal to pneumatic pressure, and an operation device 102 that operates the valve main body 100 in response to the pneumatic pressure supplied from the positioner 101.

To improve the work efficiency of valve maintenance in plants where valves such as the one shown in FIG. 15 are installed, various technologies have been proposed, including a technology for detecting the occurrence of stick-slip in the sliding portion of the valve (refer to Patent Document 1, Japanese Patent No. 3254624), a technology for determining the hunting state of the valve (refer to Patent Document 2, Japanese Patent Application Laid-Open (JP-A) No. 2015-114942), and a technology for detecting scale adhesion to the valve (refer to Patent Document 3, Japanese Patent Application Laid-Open (JP-A) No. 2015-114943). These technologies can be implemented using a positioner that detects the opening position of the valve.

The positioner that can be used to implement the failure detection technologies (diagnostic technologies) disclosed in Patent Documents 1 to 3 is of a high-spec type, and in cases where the positioner provided in an existing control valve is not of a high-spec type, it is necessary to replace the positioner. However, due to circumstances such as the specifications of the control valve itself or installation conditions in the plant, it may be difficult or impossible to replace the positioner, and improvements are being sought.

The disclosure provides a wireless opening meter, a valve maintenance support system, and a support method that may implement failure diagnosis of a control valve without using a high-spec positioner, and improve the work efficiency of control valve maintenance.

SUMMARY

The disclosure includes a wireless opening meter, which is a battery-powered type wireless opening meter attached to a control valve, including: a measurement portion, configured to measure at least one of an opening of the control valve, a pneumatic pressure supplied to an operation device of the control valve, and a temperature at an outlet side of the control valve; a failure diagnosis portion, configured to calculate an index of a change leading to a failure of the control valve based on a measurement value obtained by the measurement portion, and to execute failure diagnosis of the control valve based on the index; a wireless communication portion, configured to wirelessly transmit the index and a result of the failure diagnosis to a valve maintenance support device; and an adjustment portion, configured to compare the index with a predetermined index determination threshold, and in response to determining that a progression degree towards a failure of the control valve is small, perform thinning processing of an operation time of a wireless opening meter by extending an operation cycle of a wireless opening meter to be longer than an initial value, and in response to determining that the progression degree is large, set the operation cycle to the initial value to stop the thinning processing.

Further, the valve maintenance support system of the disclosure includes: a battery-powered type wireless opening meter attached to a control valve; and a valve maintenance support device. The wireless opening meter includes: a measurement portion, configured to measure at least one of an opening of the control valve, a pneumatic pressure supplied to an operation device of the control valve, and a temperature at an outlet side of the control valve; a failure diagnosis portion, configured to calculate an index of a change leading to a failure of the control valve based on a measurement value obtained by the measurement portion, and to execute failure diagnosis of the control valve based on the index; a first wireless communication portion, configured to wirelessly transmit the index and a result of the failure diagnosis to the valve maintenance support device; and an adjustment portion, configured to compare the index with a predetermined index determination threshold, and in response to determining that a progression degree towards a failure of the control valve is small, perform thinning processing of an operation time of the wireless opening meter by extending an operation cycle of the wireless opening meter to be longer than an initial value, and in response to determining that the progression degree is large, set the operation cycle to the initial value to stop the thinning processing. The valve maintenance support device includes: a second wireless communication portion, configured to receive the index and a result of the failure diagnosis transmitted from the wireless opening meter; and a diagnostic result present portion, configured to present the index and a result of the failure diagnosis received by the second wireless communication portion.

Further, the valve maintenance support system of the disclosure includes: a battery-powered type wireless opening meter attached to a control valve; and a valve maintenance support device. The wireless opening meter includes: a measurement portion, configured to measure at least one of an opening of the control valve, a pneumatic pressure supplied to an operation device of the control valve, and a temperature at an outlet side of the control valve; a first wireless communication portion, configured to wirelessly transmit a measurement value obtained by the measurement portion to the valve maintenance support device, and to receive a command wirelessly transmitted from the valve maintenance support device; and a controller, configured to set an operation cycle of the wireless opening meter in response to the command. The valve maintenance support device includes: a second wireless communication portion, configured to receive the measurement value transmitted from the wireless opening meter; a failure diagnosis portion, configured to calculate an index of a change leading to a failure of the control valve based on the measurement value received by the second wireless communication portion, and to execute failure diagnosis of the control valve based on the index; a diagnostic result present portion, configured to present the index and a result of the failure diagnosis; and an adjustment portion, configured to compare the index with a predetermined index determination threshold, and in response to determining that a progression degree towards a failure of the control valve is small, perform thinning processing of an operation time of the wireless opening meter by generating a command to set an operation cycle of the wireless opening meter to a value longer than an initial value, and in response to determining that the progression degree is large, stop the thinning processing by generating a command to set the operation cycle to the initial value. The second wireless communication portion is configured to wirelessly transmit a command generated by the adjustment portion to the wireless opening meter.

Further, the valve maintenance support method of the disclosure includes: a first step in which a battery-powered type wireless opening meter attached to a control valve measures at least one of an opening of the control valve, a pneumatic pressure supplied to an operation device of the control valve, and a temperature at an outlet side of the control valve; a second step in which the wireless opening meter calculates an index of a change leading to a failure of the control valve based on a measurement value obtained in the first step; a third step in which the wireless opening meter executes failure diagnosis of the control valve based on the index; a fourth step in which the wireless opening meter wirelessly transmits the index and a result of the failure diagnosis to a valve maintenance support device; a fifth step in which the wireless opening meter compares the index with a predetermined index determination threshold, and in response to determining that a progression degree towards a failure of the control valve is small, performs thinning processing of an operation time by extending an operation cycle of the wireless opening meter to be longer than an initial value; and a sixth step in which the wireless opening meter compares the index with the index determination threshold, and in response to determining that the progression degree is large, sets the operation cycle to the initial value to stop the thinning processing.

Further, the valve maintenance support method of the disclosure includes: a first step in which a battery-powered type wireless opening meter attached to a control valve measures at least one of an opening of the control valve, a pneumatic pressure supplied to an operation device of the control valve, and a temperature at an outlet side of the control valve; a second step in which the wireless opening meter calculates an index of a change leading to a failure of the control valve based on a measurement value obtained in the first step; a third step in which the wireless opening meter executes failure diagnosis of the control valve based on the index; a fourth step in which the wireless opening meter wirelessly transmits the index and a result of the failure diagnosis to a valve maintenance support device; a fifth step in which the valve maintenance support device receives the index and a result of the failure diagnosis transmitted from the wireless opening meter; a sixth step in which the valve maintenance support device presents the index and a result of the failure diagnosis received in the fifth step; a seventh step in which the wireless opening meter compares the index with a predetermined index determination threshold, and in response to determining that a progression degree towards a failure of the control valve is small, performs thinning processing of an operation time by extending an operation cycle of the wireless opening meter to be longer than an initial value; and an eighth step in which the wireless opening meter compares the index with the index determination threshold, and in response to determining that the progression degree is large, sets the operation cycle to the initial value to stop the thinning processing.

Further, the valve maintenance support method of the disclosure includes: a first step in which a battery-powered type wireless opening meter attached to a control valve measures at least one of an opening of the control valve, a pneumatic pressure supplied to an operation device of the control valve, and a temperature at an outlet side of the control valve; a second step in which the wireless opening meter wirelessly transmits a measurement value obtained in the first step to a valve maintenance support device; a third step in which the valve maintenance support device receives the measurement value transmitted from the wireless opening meter; a fourth step in which the valve maintenance support device calculates an index of a change leading to a failure of the control valve based on the measurement value received in the third step; a fifth step in which the valve maintenance support device executes failure diagnosis of the control valve based on the index; a sixth step in which the valve maintenance support device presents the index and a result of the failure diagnosis; a seventh step in which the valve maintenance support device compares the index with a predetermined index determination threshold, and in response to determining that a progression degree towards a failure of the control valve is small, performs thinning processing of an operation time of the wireless opening meter by generating a command to set an operation cycle of the wireless opening meter to a value longer than an initial value; an eighth step in which the valve maintenance support device compares the index with the index determination threshold, and in response to determining that the progression degree is large, stops the thinning processing by generating a command to set the operation cycle to the initial value; a ninth step in which the valve maintenance support device wirelessly transmits the command generated in the seventh step or the eighth step to the wireless opening meter; a tenth step in which the wireless opening meter receives the command; and an eleventh step in which the wireless opening meter sets an operation cycle of the wireless opening meter according to the command received in the tenth step.

DESCRIPTION OF THE EMBODIMENTS

Figure 1:
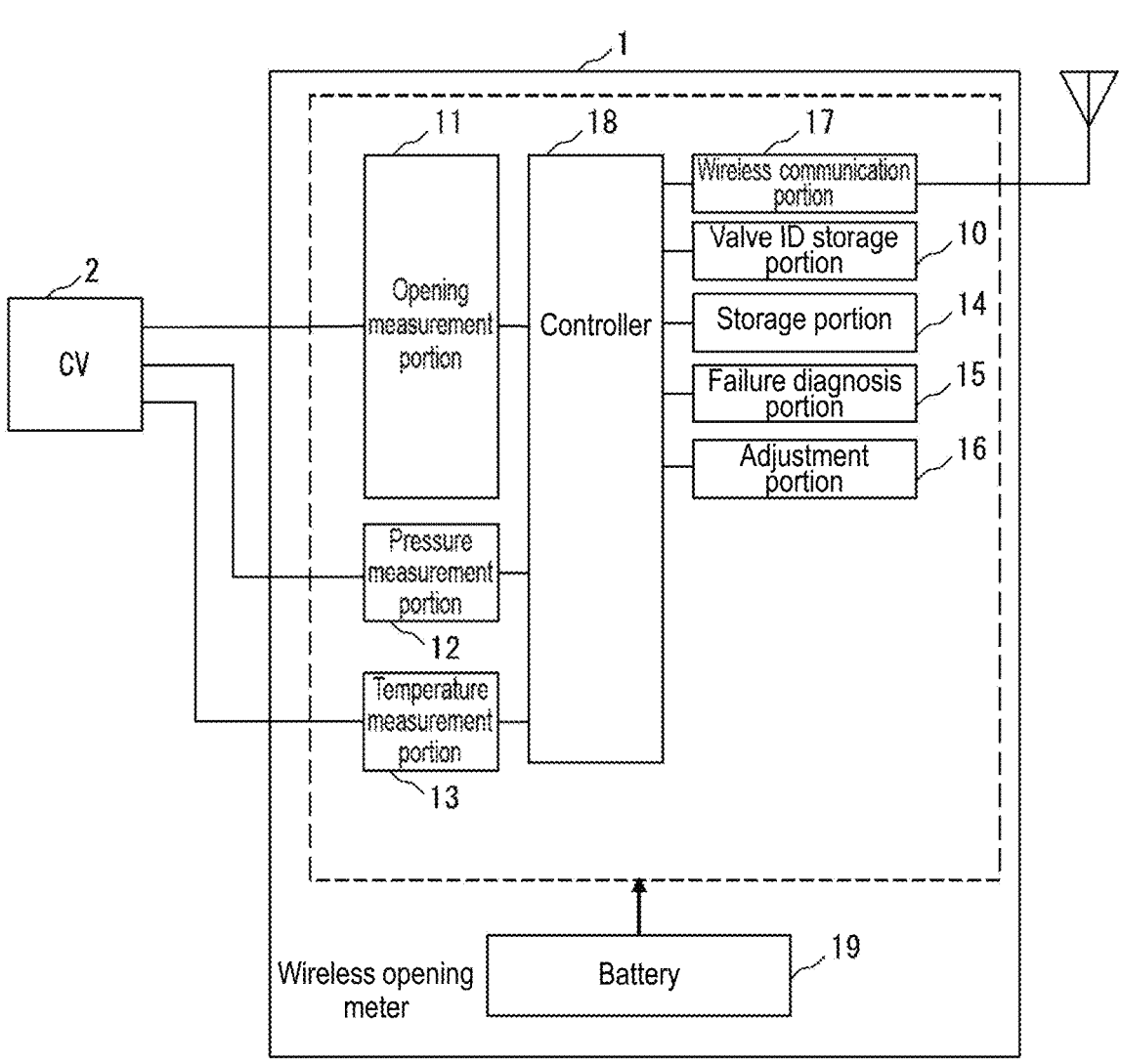
FIG. 1 is a block diagram showing the configuration of the wireless opening meter of the valve maintenance support system according to the first embodiment of the disclosure.

In one configuration example of the wireless opening meter of the disclosure, a failure of the control valve targeted for the failure diagnosis is a gradually progressing failure specific to the control valve.

Further, in one configuration example of the wireless opening meter of the disclosure, in a case of simultaneously observing a progress of a plurality of types of failures of the control valve, the index determination thresholds corresponding to the plurality of types of failures are preset respectively such that periods from when the thinning processing is stopped based on a comparison between the index and the index determination threshold until a failure is detected are equivalent for the plurality of types of failures.

Further, in one configuration example of the valve maintenance support system of the disclosure, a failure of the control valve targeted for the failure diagnosis is a gradually progressing failure specific to the control valve. Further, in one configuration example of the valve maintenance support system of the disclosure, in a case of simultaneously observing a progress of a plurality of types of failures of the control valve, the index determination thresholds corresponding to the plurality of types of failures are preset respectively such that periods from when the thinning processing is stopped based on a comparison between the index and the index determination threshold until a failure is detected are equivalent for the plurality of types of failures. Further, in one configuration example of the valve maintenance support system of the disclosure, a failure of the control valve targeted for the failure diagnosis includes at least one of stick-slip, deterioration of V-packing, deterioration of diaphragm of operation device, deterioration of diaphragm of valve body, deterioration of parts due to heat cycle, damage of bellows seal, and rupture of bellows seal.

According to the disclosure, by providing a battery-powered type wireless opening meter with a measurement portion, a failure diagnosis portion, and a wireless communication portion, it is possible to achieve failure diagnosis of the control valve without using a high-spec positioner, thereby improving the work efficiency of control valve maintenance. In the disclosure, by providing an adjustment portion in the wireless opening meter and appropriately thinning the operation time of the wireless opening meter according to the progression degree towards the failure of the control valve, it is possible to reduce the battery consumption of the wireless opening meter.

Furthermore, in the disclosure, by providing a battery-powered type wireless opening meter with a measurement portion and a first wireless communication portion, and providing a valve maintenance support device with a second wireless communication portion and a failure diagnosis portion, it is possible to achieve failure diagnosis of the control valve without using a high-spec positioner, thereby improving the work efficiency of control valve maintenance. In the disclosure, by providing an adjustment portion in the valve maintenance support device and a controller in the wireless opening meter, and appropriately thinning the operation time of the wireless opening meter according to the progression degree towards the failure of the control valve, it is possible to reduce the battery consumption of the wireless opening meter.

Further, in the disclosure, in a case of simultaneously observing a progress of a plurality of types of failures of the control valve, by pre-setting the index determination thresholds corresponding to the plurality of types of failures respectively such that periods from when the thinning processing is stopped based on a comparison between the index and the index determination threshold until a failure is detected are equivalent for the plurality of types of failures, it is possible to make the grace period until the valve maintenance implementation date and time, which the system operator recognizes, equivalent for a plurality of types of failures.

Principle of the Disclosure 1

In the case of modifying to detect the opening position while keeping the existing positioner attached, considering the installation conditions in an average petrochemical plant, it is preferable to attach a battery-powered type opening measurement device (wireless opening meter) to the valve using wireless communication. With a wireless opening meter, new wiring work becomes unnecessary, so the probability of applying it to existing control valves increases. The wireless opening meter is assumed to be used for long periods specific to valve failure detection (diagnosis), and specifications that may extend battery life are further preferable. Also, based on the premise of keeping the existing positioner attached, it is not necessary to completely replace the role of a high-spec positioner, and specifications specialized for failure detection (diagnosis) such as detecting stick-slip are sufficient.

The inventor focused on the fact that failures such as stick-slip are valve-specific cumulative sliding abnormalities, not failures that occur suddenly, but failures that progress gradually. Then, the inventor came up with the idea of appropriately thinning the operation time of the wireless opening meter according to the progression degree of the failure to reduce battery consumption. It is noted that gradually progressing failures are not limited to stick-slip.

Principle of the Disclosure 2

Gradually progressing failures are not limited to stick-slip, and depending on the type of valve, a plurality of different types of failures may need to be observed simultaneously. In this case, since they are different types of failures, it is not preferable to have no specific rule for the determination index to appropriately thin the operation time of the wireless opening meter according to the progression degree of the failure. For example, if the determination index for stick-slip terminates thinning even when the progression degree is relatively small, while for other abnormalities (specifically listed in the embodiments described later) the determination index continues thinning even when the progression degree is relatively large, it could become a factor that confuses the operation of plant maintenance.

Thus, it is preferable to set the determination index (e.g., threshold values) so that the period until failures are likely to be detected becomes equivalent for a plurality of different types of failures. For example, a rule may be established to terminate thinning when there is a high possibility of detecting failures after 100 days for all types of failures. Then, for a plurality of different types of failures, thinning is terminated if it is determined that any of them should terminate the thinning of operation time. As a result, even if thinning is terminated due to the progression of any failure, plant operators may simply interpret that a grace period of about 100 days is expected.

First Embodiment

Hereinafter, the embodiment of the disclosure is described with reference to the drawings. This embodiment corresponds to the above-mentioned Principle of the Disclosure 1 and Principle of the Disclosure 2. FIG. 1 is a block diagram showing the configuration of the wireless opening meter of the valve maintenance support system according to this embodiment. In the following embodiments, to keep the description concise, examples such as valve IDs are simplified compared to those used in actual plants.

A battery-powered type wireless opening meter 1 attached to a control valve 2 includes: a valve ID storage portion 10 that stores an ID (identification information) unique to the valve 2 to which the wireless opening meter 1 is attached; an opening measurement portion 11 that continuously measures the opening of the valve 2; a pressure measurement portion 12 that measures the pneumatic pressure supplied to the operation device of the valve 2; a temperature measurement portion 13 that measures the temperature at the outlet side of the valve 2; a storage portion 14 that stores the opening measurement value, pressure measurement value, and temperature measurement value; a failure diagnosis portion 15 that calculates an index of a change leading to a failure of the valve 2 based on the measurement values, and executes failure diagnosis of the valve 2 based on the index; an adjustment portion 16 that compares the index with a predetermined index determination threshold, and in response to determining that a progression degree towards a failure of the valve 2 is small, performs thinning processing of an operation time of the wireless opening meter 1 by extending an operation cycle of the wireless opening meter 1 to be longer than an initial value, and in response to determining that the progression degree is large, sets the operation cycle to the initial value to stop the thinning processing; a wireless communication portion 17 that wirelessly transmits the index and a results of the failure diagnosis to a valve maintenance support device; a controller 18 that controls the entire wireless opening meter; and a battery 19 that supplies power to each portion of the wireless opening meter 1.

Figure 2:
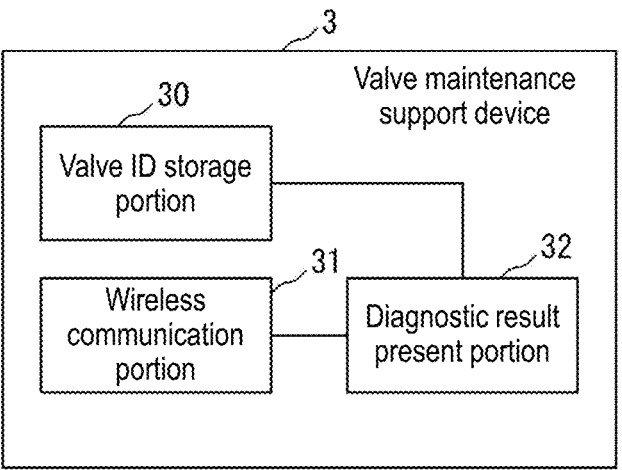
FIG. 2 is a block diagram showing the configuration of the valve maintenance support device of the valve maintenance support system according to the first embodiment of the disclosure.

FIG. 2 is a block diagram showing the configuration of the valve maintenance support device of the valve maintenance support system according to this embodiment. The valve maintenance support device 3 includes: a valve ID storage portion 30 that stores an ID of the control valve 2 that may be a candidate for maintenance; a wireless communication portion 31 that receives the index and the results of the failure diagnosis transmitted from the wireless opening meter 1; and a diagnostic result present portion 32 that presents the index and the results of the failure diagnosis received by the wireless communication portion 31.

Figure 3:
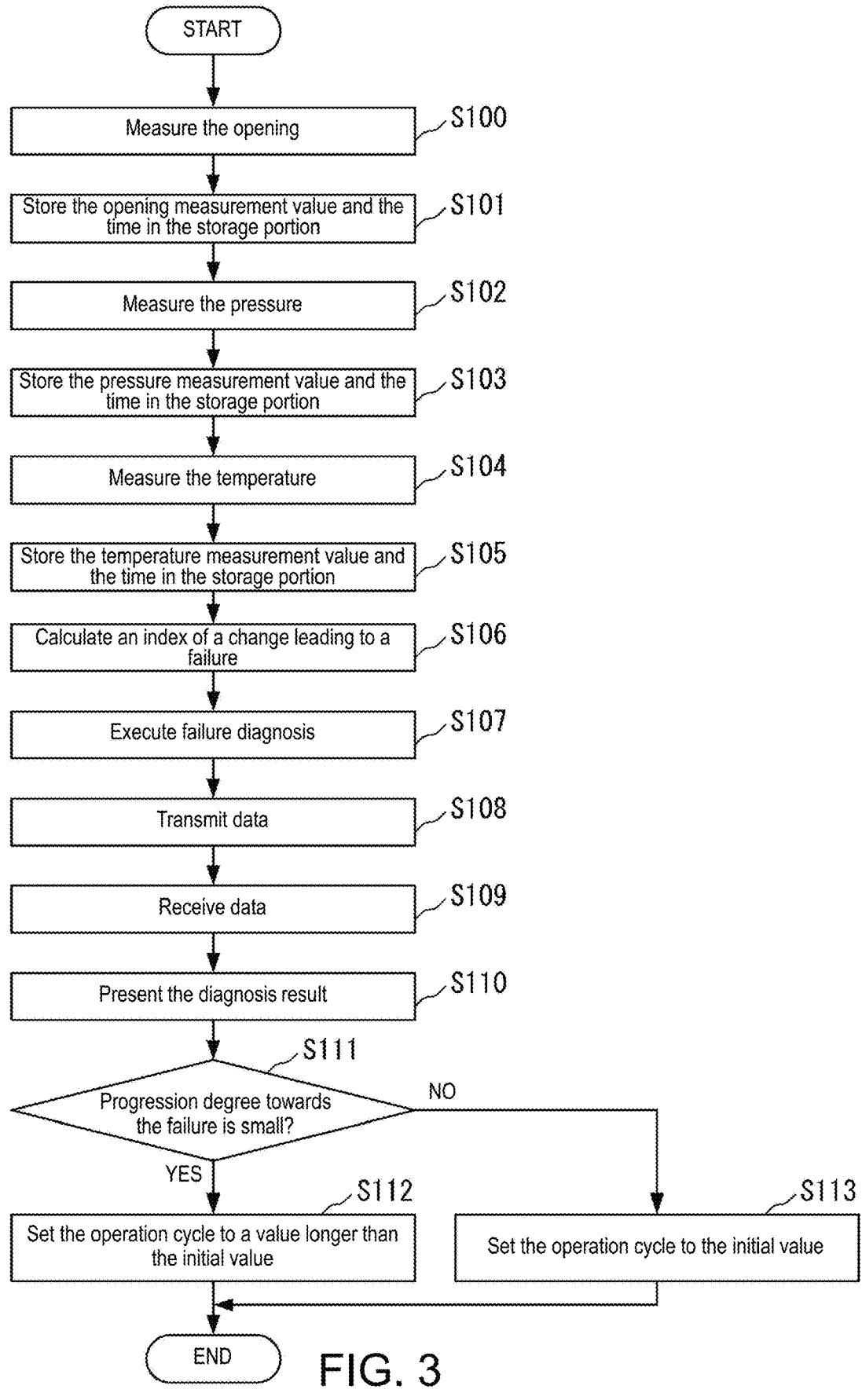
FIG. 3 is a flowchart describing the operation of the valve maintenance support system according to the first embodiment of the disclosure.
Figure 4:
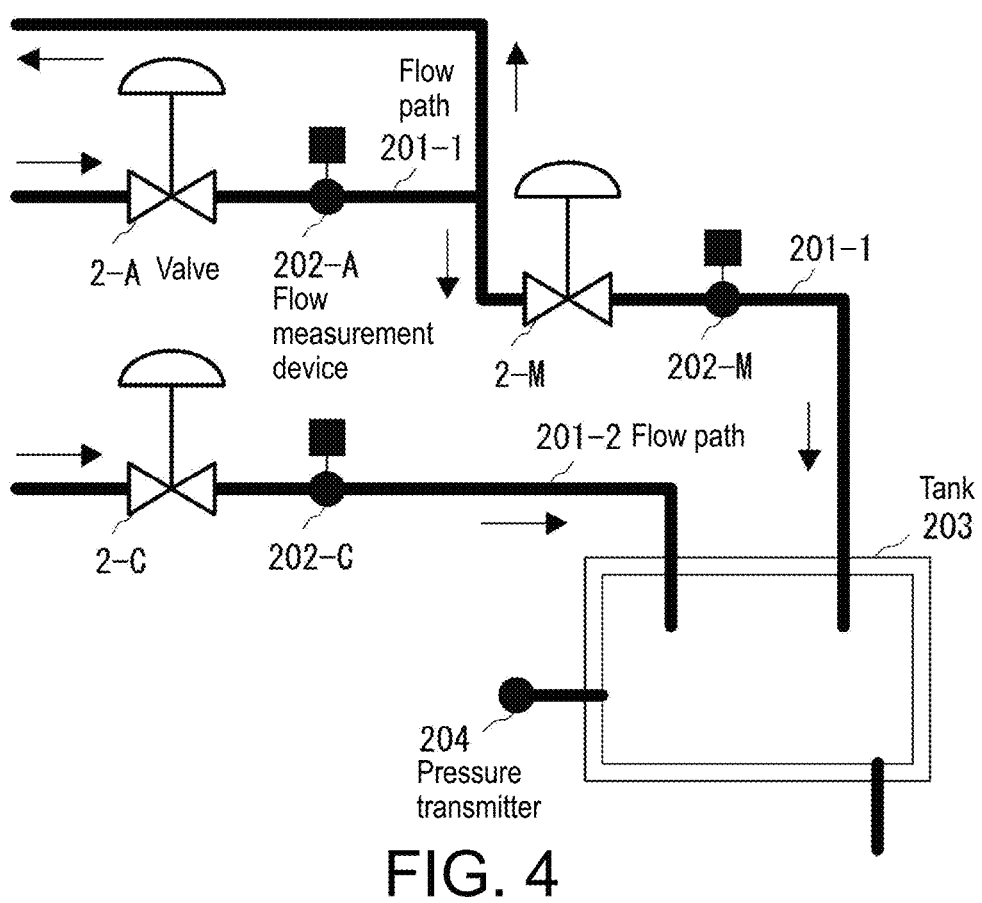
FIG. 4 is a diagram showing an example configuration of a plant.

FIG. 3 is a flowchart describing the operation of the valve maintenance support system of this embodiment. In this embodiment, for example, it is assumed that a plurality of valves are installed in a plant, and unique IDs are pre-assigned to each of these valves. For instance, in the example of FIG. 4, control valves 2-A and 2-M with valve IDs "A" and "M" respectively are installed in flow path 201-1, and control valve 2-C with valve ID "C" is installed in flow path 201-2. In FIG. 4, 202-A, 202-C, and 202-M are flow measurement devices, 203 is a tank, and 204 is a pressure transmitter.

In FIG. 4, valves other than valves 2-A, 2-C, and 2-M are omitted for simplicity. In this embodiment, it is assumed that valves 2-A, 2-C, and 2-M are specifically selected as the highest priority maintenance targets in a particular periodic plant maintenance, and valve IDs "A", "C", and "M" are pre-stored in the valve ID storage portion 30.

Further, ID "A" is stored in the valve ID storage portion 10 of the wireless opening meter 1 attached to valve 2-A, ID "C" is stored in the valve ID storage portion 10 of the wireless opening meter 1 attached to valve 2-C, and ID "M" is stored in the valve ID storage portion 10 of the wireless opening meter 1 attached to valve 2-M.

The opening measurement portion 11 of the wireless opening meter 1 attached to each of the valves 2-A, 2-C, and 2-M, for example, continuously measures the valve opening by continuously detecting the rotation angle of the stem (valve rod) of valves 2-A, 2-C, and 2-M (FIG. 3, step S100). The configuration of such an opening measurement portion 11 (opening sensor) is disclosed in, for example, Japanese Patent Application Laid-Open Publication No. 2021-026268, so a detailed description is omitted.

The controller 18 of each wireless opening meter 1 receives opening measurement values from its own opening measurement portion 11, and stores the received opening measurement values and the reception times of the opening measurement values in the storage portion 14 (FIG. 3, step S101).

On the other hand, the pressure measurement portion 12 of each wireless opening meter 1 continuously measures the pneumatic pressure supplied to the operation devices of valves 2-A, 2-C, and 2-M respectively (FIG. 3, step S102). The controller 18 of each wireless opening meter 1 receives pressure measurement values from its own pressure measurement portion 12, and stores the received pressure measurement values and the reception times of the pressure measurement values in the storage portion 14 (FIG. 3, step S103).

The temperature measurement portion 13 of each wireless opening meter 1 continuously measures the temperature at the outlet side of valves 2-A, 2-C, and 2-M respectively (FIG. 3, step S104). The controller 18 of each wireless opening meter 1 receives temperature measurement values from its own temperature measurement portion 13, and stores the received temperature measurement values and the reception times of the temperature measurement values in the storage portion 14 (FIG. 3, step S105).

Although not explicitly stated in FIG. 3, the opening measurement portion 11, the pressure measurement portion 12, the temperature measurement portion 13, and the controller 18 perform the processes of steps S100 to S105 periodically. By repeating the processes of steps S100 to S105, time series data of opening measurement values, time series data of pressure measurement values, and time series data of temperature measurement values are accumulated in the storage portion 14. It is noted that the measurement cycle of the opening measurement values, pressure measurement values, and temperature measurement values is set to a value shorter than the operation cycle of the wireless opening meter 1, which is described later.

Next, the failure diagnosis portion 15 of each wireless opening meter 1 calculates an index of a change leading to failure of valves 2-A, 2-C, and 2-M based on at least one of the time series data of opening measurement values, time series data of pressure measurement values, and time series data of temperature measurement values stored in its own storage portion 14 (FIG. 3, step S106), and executes failure diagnosis of valves 2-A, 2-C, and 2-M based on the index (FIG. 3, step S107).

For example, in the case of applying the technology for detecting the occurrence of stick-slip in the sliding portion of the valve (Patent Document 1) to this embodiment, the failure diagnosis portion 15 calculates the mean square value and the average value of the movement amount (information equivalent to speed) of the valve opening in the diagnostic target period derived from the time series data of opening measurement values, and further calculates the ratio A τ(=mean square value/average value) of the average value and the mean square value, and uses the difference A τ–A between this ratio A τ and the ratio A of the normal state stored in advance as an index of a change leading to a failure (step S106). The failure diagnosis portion 15 determines that there is a possibility of stick-slip occurring (failure detection) when the difference A τ–A becomes equal to or greater than a predetermined diagnostic threshold, and determines that it is normal when the difference A τ–A is less than the diagnostic threshold (step S107).

In the case of applying the technology for detecting deterioration of the V-packing of the valve (Japanese Patent No. 6851938) to this embodiment, the failure diagnosis portion 15 uses the speed index (maximum operation speed) of the valve in the diagnostic target period calculated from the time series data of opening measurement values, and the friction force index (pressure difference depending on the opening direction) of the valve in the diagnostic target period calculated from the time series data of opening measurement values and the time series data of pressure measurement values, as indices of changes leading to failure (step S106). The failure diagnosis portion 15 determines that there is a possibility of V-packing deterioration occurring when the speed index is equal to or greater than a predetermined speed threshold (diagnostic threshold) and the friction force index is equal to or less than a predetermined friction force threshold (diagnostic threshold) (step S107).

In the case of applying the technology for detecting deterioration of the diaphragm of the valve operation device (Japanese Patent No. 6978252) to this embodiment, the failure diagnosis portion 15 uses the product of the operation amount (e.g., the number of operations or sliding distance) of the valve in the diagnostic target period calculated from the time series data of opening measurement values, and the average value of pressure in the diagnostic target period calculated from the time series data of pressure measurement values, as an index of a change leading to a failure (step S106). The failure diagnosis portion 15 determines that there is a possibility of deterioration of the diaphragm of the operation device occurring when the calculated product becomes equal to or greater than a predetermined diagnostic threshold (step S107).

In the case of applying the technology for detecting deterioration (hardening) of the diaphragm of the valve body in valves (Japanese Patent No. 6981815) to this embodiment, the failure diagnosis portion 15 uses the biting amount of the valve body in the closing direction after recognizing that the valve has been fully closed, calculated from the time series data of opening measurement values, as an index of a change leading to a failure (step S106). The failure diagnosis portion 15 determines that there is a possibility of deterioration of the diaphragm of the valve body occurring when the calculated biting amount is equal to or less than a predetermined diagnostic threshold (step S107).

In the case of applying the technology for detecting deterioration of parts due to heat cycle (e.g., loosening of the seat ring) (Japanese Patent No. 6981816) to this embodiment, the failure diagnosis portion 15 uses the product of the temperature difference of the valve and the number of cycles in the diagnostic target period, calculated from the time series data of temperature measurement values, as an index of a change leading to a failure (step S106). The failure diagnosis portion 15 determines that there is a possibility of deterioration of valve components occurring when the calculated product becomes equal to or greater than a predetermined diagnostic threshold (step S107).

In the case of applying the technology for detecting damage to the bellows seal of the valve (Japanese Patent No. 7000123) to this embodiment, the failure diagnosis portion 15, based on the time series data of opening measurement values and the time series data of pressure measurement values, calculates the relationship between the pneumatic pressure required to change the valve opening in the direction of increasing it and the valve opening (characteristic I), and the relationship between the pneumatic pressure required to change the valve opening in the direction of decreasing it and the valve opening (characteristic II), then calculates the absolute value of the difference between characteristic I and a predetermined reference (e.g., characteristic I in a normal state) as the difference on the characteristic I side, and the absolute value of the difference between characteristic II and a reference (e.g., characteristic II in a normal state) as the difference on the characteristic II side, thereby calculating the difference (absolute value) of the difference between the difference on the characteristic I side and the difference on the characteristic II side as an index of a change leading to a failure (step S106). The failure diagnosis portion 15 determines that there is a possibility of damage occurring to the bellows seal of the valve when the calculated index becomes equal to or greater than a predetermined diagnostic threshold only in the tensile region (low opening region) (step S107).

In the case of applying the technology for detecting rupture of the bellows seal of the valve (Japanese Patent No. 7000125) to this embodiment, the failure diagnosis portion 15 uses the pressure difference (maximum friction force) between the pneumatic pressure required to increase the valve opening and the pneumatic pressure required to decrease the valve opening, calculated from the time series data of opening measurement values and the time series data of pressure measurement values, as an index of a change leading to a failure (step S106). The failure diagnosis portion 15 determines that there is a possibility of rupture occurring in the bellows seal of the valve when the calculated pressure difference becomes equal to or less than a predetermined diagnostic threshold (step S107).

The wireless communication portion 17 of each wireless opening meter 1 wirelessly transmits data to the valve maintenance support device 3, including the valve ID stored in its own valve ID storage portion 10, the opening measurement value, the pressure measurement value, the temperature measurement value, the index of the change leading to a failure, and the result of failure diagnosis by the failure diagnosis portion 15 (FIG. 3, step S108).

The wireless communication portion 31 of the valve maintenance support device 3 receives the data transmitted from each wireless opening meter 1 (FIG. 3, step S109). The diagnostic result present portion 32 of the valve maintenance support device 3 presents the index of the change leading to a failure and the result of failure diagnosis to the operator for each valve ID (for each valve ID included in the received data) stored in its own valve ID storage portion 30 (FIG. 3, step S110).

Next, the adjustment portion 16 of each wireless opening meter 1 compares the index of the change leading to a failure with a predetermined index determination threshold, in response to determining that the progression degree towards failure of the control valve to which it is attached is small (YES in FIG. 3, step S111), performs thinning processing of the operation time of the wireless opening meter 1 by extending at least one of the operation cycle of the failure diagnosis portion 15 and the operation cycle (data transmission cycle) of the wireless communication portion 17 to be longer than their initial values (FIG. 3, step S112). Specifically, this may be achieved by automatically adjusting the parameter value that defines the operation cycle of the wireless opening meter 1.

Further, in response to determining that the progression degree towards failure of the control valve to which it is attached is large (NO in step S111), the adjustment portion 16 sets the operation cycle of the failure diagnosis portion 15 and the operation cycle of the wireless communication portion 17 to their initial values, and stops the thinning processing of the operation time (FIG. 3, step S113). The processes from step S106 to S113 are performed for each operation cycle of the wireless opening meter 1.

In this embodiment, the valve stick-slip detection (Patent Document 1) is used as a specific example to further supplement the description. To express stick-slip simply, it is a phenomenon in which sudden acceleration and sudden stops increase in valve operation, and this may be diagnosed using data that may be measured solely by the opening measurement portion 11, such as when the balance between the detected average speed and maximum speed is disrupted, or when the balance of the distribution of speed and acceleration is disrupted. FIG. 4 in Patent Document 1 corresponds to the case where the balance of the distribution of speed and acceleration is disrupted. Here, one sample is defined as the movement amount (information equivalent to speed) of the valve opening every 40 milliseconds over 400 seconds (the aforementioned diagnostic target period), and the mean square value and the average value of one sample are used as the index of the change leading to a failure.

Figure 5:
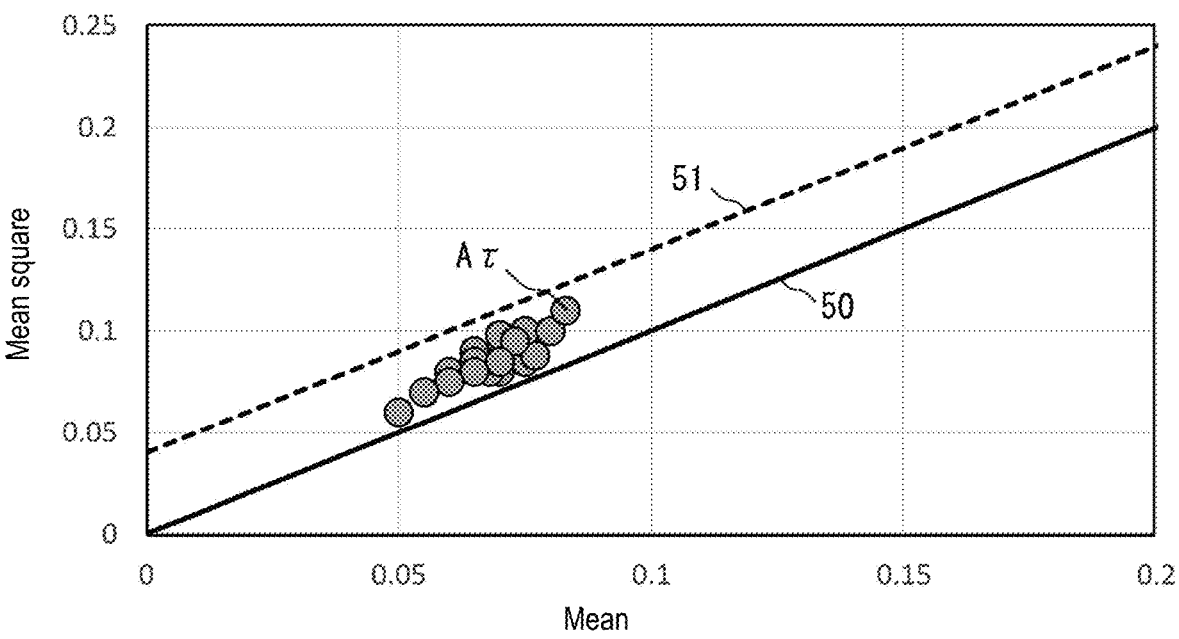
FIG. 5 is a characteristic diagram showing measurement results in the case where valve stick-slip does not occur in conventional technology.
Figure 6:
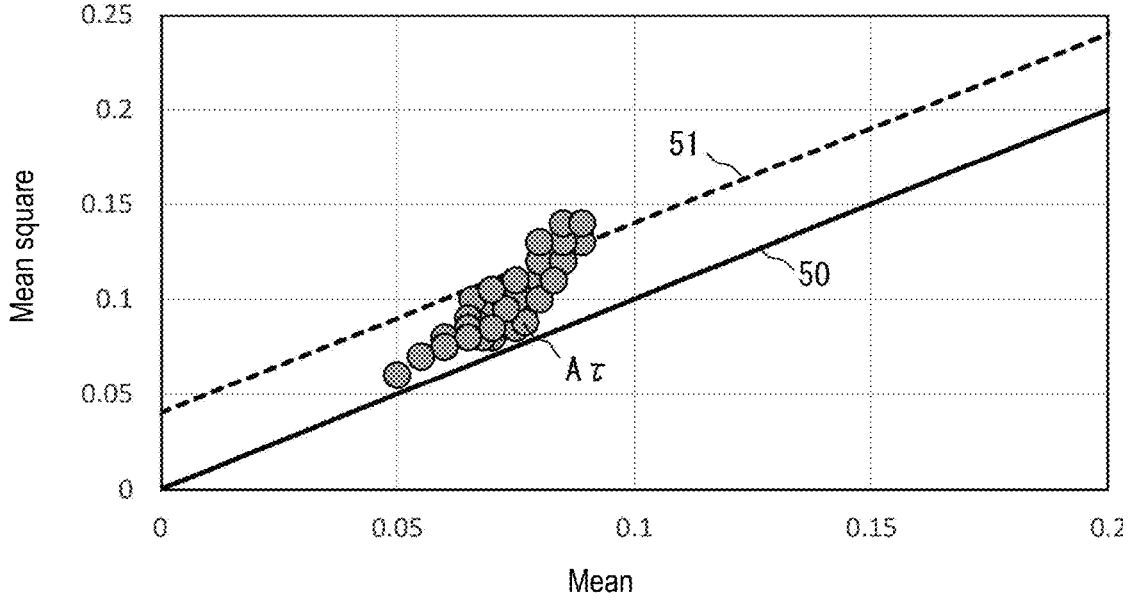
FIG. 6 is a characteristic diagram showing measurement results in the case where valve stick-slip occurs in conventional technology.

FIG. 5 is a characteristic diagram showing measurement results in the case where valve stick-slip does not occur in conventional technology, and FIG. 6 is a characteristic diagram showing measurement results in the case where valve stick-slip occurs. In the technology disclosed in Patent Document 1, the ratio A $\tau$(=mean square value/average value) of the average value and the mean square value is calculated, and the difference A $\tau$–A between this ratio A $\tau$ and the ratio A in the normal state is compared with a predetermined diagnostic threshold to detect stick-slip. In the example of FIG. 5, the solid line 50 indicates the ratio A in the normal state, the difference between the ratio A $\tau$ indicated by black circles and the solid line 50 becomes A $\tau$–A, and the difference between the dashed line 51 and the solid line 50 becomes the diagnostic threshold.

Figure 7:
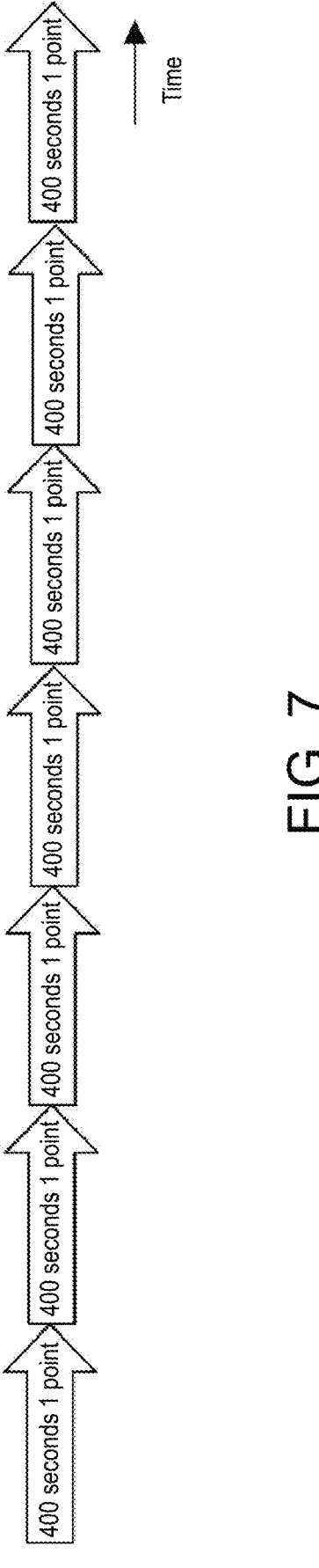
FIG. 7 is a diagram showing operation frequency in conventional technology.

In the technology disclosed in Patent Document 1, since only the diagnostic threshold is set, data collection is performed at a specified operation frequency. For example, as shown in FIG. 7, the operation cycle is fixed so that the index calculation and failure diagnosis are performed every 400 seconds.

Figure 8:
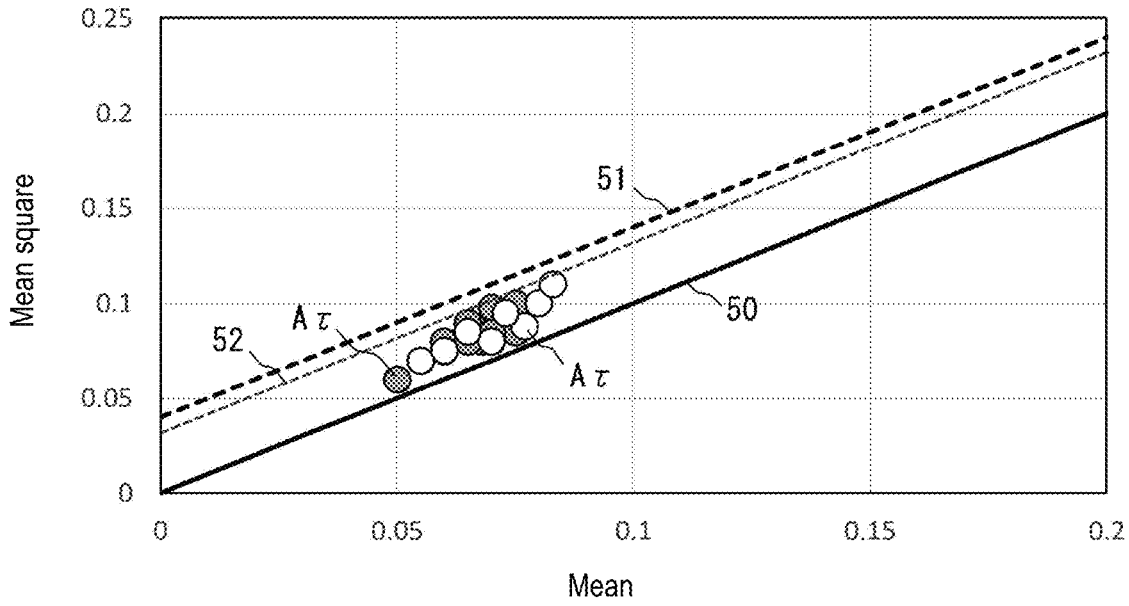
FIG. 8 is a characteristic diagram showing measurement results in the case where valve stick-slip does not occur in the first embodiment of the disclosure.
Figure 9:
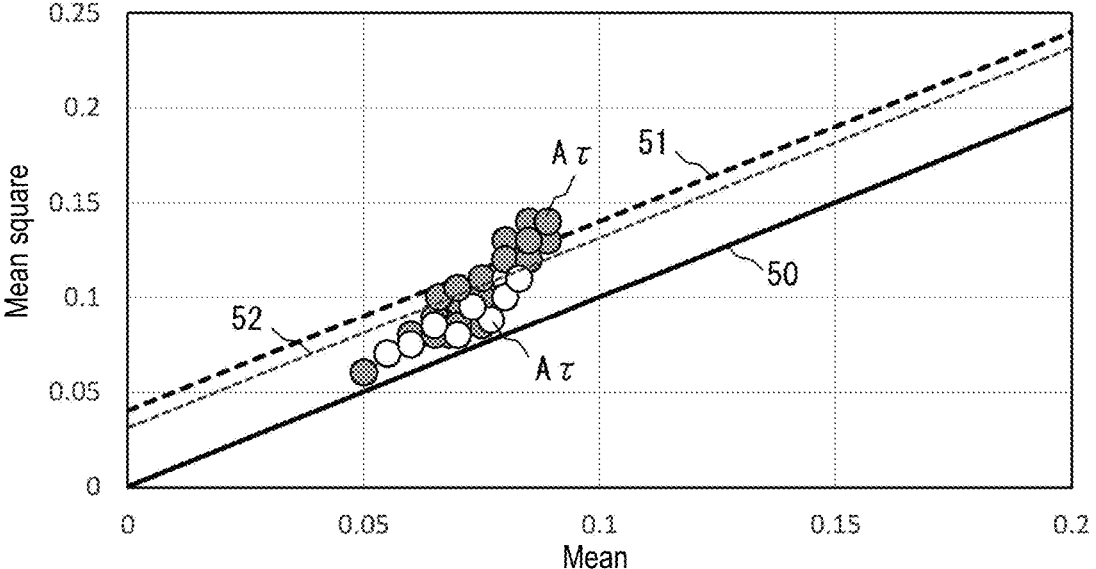
FIG. 9 is a characteristic diagram showing measurement results in the case where valve stick-slip occurs in the first embodiment of the disclosure.
Figure 10:
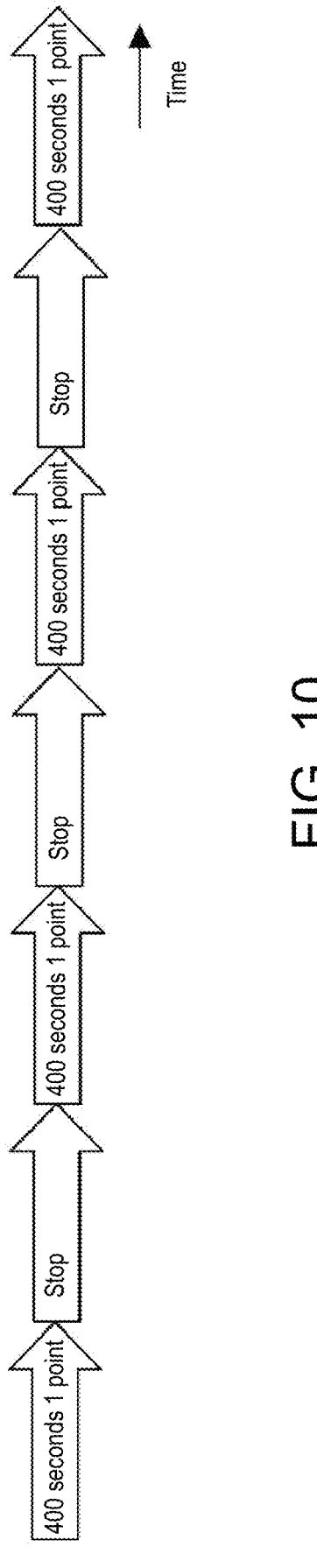
FIG. 10 is a diagram showing an example of reducing operation frequency in the first embodiment of the disclosure.

FIG. 8 is a characteristic diagram showing measurement results in the case where valve stick-slip does not occur in this embodiment, and FIG. 9 is a characteristic diagram showing measurement results in the case where valve stick-slip occurs. In FIG. 8 and FIG. 9, the difference between the dashed line 52 and the solid line 50 becomes the index determination threshold. In this embodiment, in the range where the index (difference A $\tau$–A) is equal to or less than the index determination threshold, the operation frequency of the wireless opening meter 1 is reduced to decrease the consumption of the battery 19. In the examples of FIG. 8 and FIG. 9, among the ratios A t indicated by black and white circles, the white circles indicate the values thinned out by this embodiment. As an example of reducing the operation frequency, when the index exceeds the index determination threshold, the index calculation and failure diagnosis are performed every 400 seconds as shown in FIG. 7, and in the range where the index is equal to or less than the index determination threshold, the index calculation and failure diagnosis are performed, for example, every 800 seconds as shown in FIG. 10.

In the above example, the description was given using the case of stick-slip, but when simultaneously observing the progress of a plurality of types of failures such as stick-slip, deterioration of V-packing, deterioration of the diaphragm of the operation device, deterioration of the diaphragm of the valve body, deterioration of parts due to heat cycle, and damage or rupture of the bellows seal, it is preferable to preset each of the index determination thresholds corresponding to the plurality of types of failures so that the period from when the thinning processing is stopped based on the comparison between the index and the index determination threshold until the failure is detected becomes equivalent for the plurality of types of failures. This period prediction may be statistically derived from data on past failure occurrences. Alternatively, in the case where there is no past data, the index determination threshold may be provisionally set in the early stages of valve operation, and the index determination threshold may be adjusted as appropriate after confirming the initial progression of abnormal signs.

In the case of applying the technology for detecting deterioration of V-packing in valves (Japanese Patent No. 6851938) to this embodiment, the adjustment portion 16 performs thinning processing of the operation time when at least one of the following occurs: the speed index is below a predetermined speed index determination threshold (speed index determination threshold<speed threshold), or the friction force index exceeds a predetermined friction force index determination threshold (friction force index determination threshold>friction force threshold).

In the case of applying the technology for detecting deterioration of the diaphragm of the operation device in valves (Japanese Patent No. 6978252) to this embodiment, the adjustment portion 16 performs thinning processing of the operation time in the range where the index (product of operation amount and pressure) is equal to or less than a predetermined index determination threshold (index determination threshold<diagnostic threshold).

In the case of applying the technology for detecting deterioration (hardening) of the diaphragm of the valve body in valves (Japanese Patent No. 6981815) to this embodiment, thinning processing of the operation time is performed in the range where the index (biting amount into the closing direction of the valve body) is equal to or greater than a predetermined index determination threshold (index determination threshold>diagnostic threshold).

In the case of applying the technology for detecting deterioration of parts due to heat cycle in valves (e.g., loosening of the seat ring) (Japanese Patent No. 6981816) to this embodiment, the adjustment portion 16 performs thinning processing of the operation time in the range where the index (product of temperature difference and number of cycles) is equal to or less than a predetermined index determination threshold (index determination threshold<diagnostic threshold).

In the case of applying the technology for detecting damage to the bellows seal in valves (Japanese Patent No. 7000123) to this embodiment, the adjustment portion 16 performs thinning processing of the operation time in the range where the index (difference between the difference on characteristic I side and the difference on characteristic II side) is equal to or less than a predetermined index determination threshold (index determination threshold<diagnostic threshold).

In the case of applying the technology for detecting rupture of the bellows seal in valves (Japanese Patent No. 7000125) to this embodiment, the adjustment portion 16 performs thinning processing of the operation time in the range where the index (pressure difference) is equal to or greater than a predetermined index determination threshold (index determination threshold>diagnostic threshold).

In the case of simultaneously observing the progress of a plurality of types of failures, the adjustment portion 16 determines that thinning processing of the operation time of the wireless opening meter 1 attached to this control valve should be performed when it obtains determination results indicating that the progression degree is small for all failures of the same control valve. Further, the adjustment portion 16 determines that thinning processing of the operation time of the wireless opening meter 1 attached to this control valve should be terminated when it obtains a determination result indicating that the progression degree is large for at least one failure of the same control valve.

As described above, in this embodiment, by appropriately thinning the operation time of the wireless opening meter 1 according to the progression degree of failures in the control valve, it is possible to reduce battery consumption.

It is noted that although in this embodiment, the valve ID, measurement values, index, and failure diagnosis results are transmitted to the valve maintenance support device 3, in addition to these, information on the operation cycle of the wireless opening meter 1 may also be transmitted to the valve maintenance support device 3. This allows the operator of the valve maintenance support device 3 to recognize whether the thinning processing of the operation time of the wireless opening meter 1 has been terminated or not.

Second Embodiment

Figure 11:
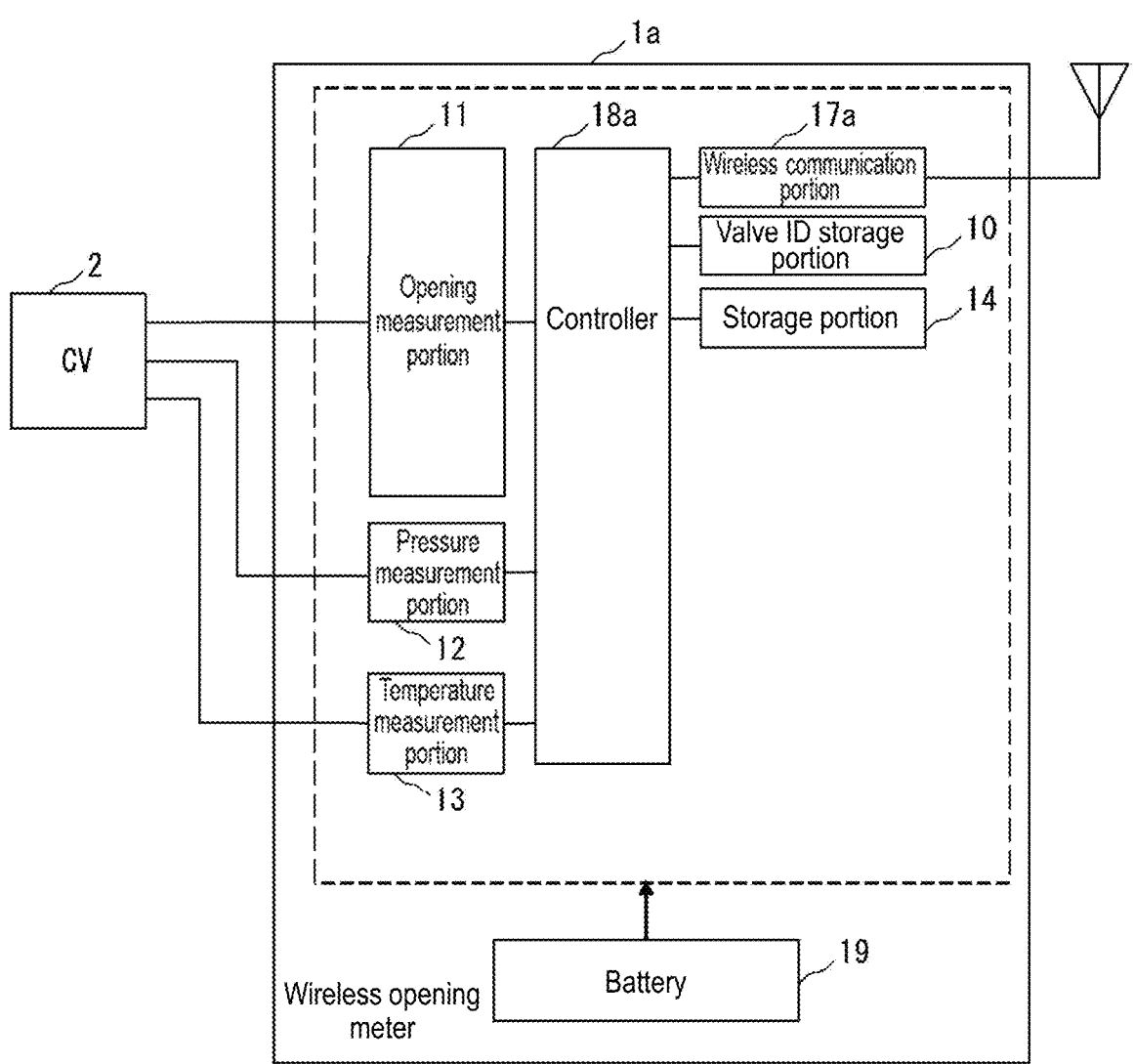
FIG. 11 is a block diagram showing the configuration of the wireless opening meter of the valve maintenance support system according to the second embodiment of the disclosure.

Next, the second embodiment of the disclosure is described. FIG. 11 is a block diagram showing the configuration of the wireless opening meter 1a of the valve maintenance support system according to this embodiment. The wireless opening meter 1a includes a valve ID storage portion 10, an opening measurement portion 11, a pressure measurement portion 12, a temperature measurement portion 13, a storage portion 14, a wireless communication portion 17a, a controller 18a, and a battery 19.

Figure 12:
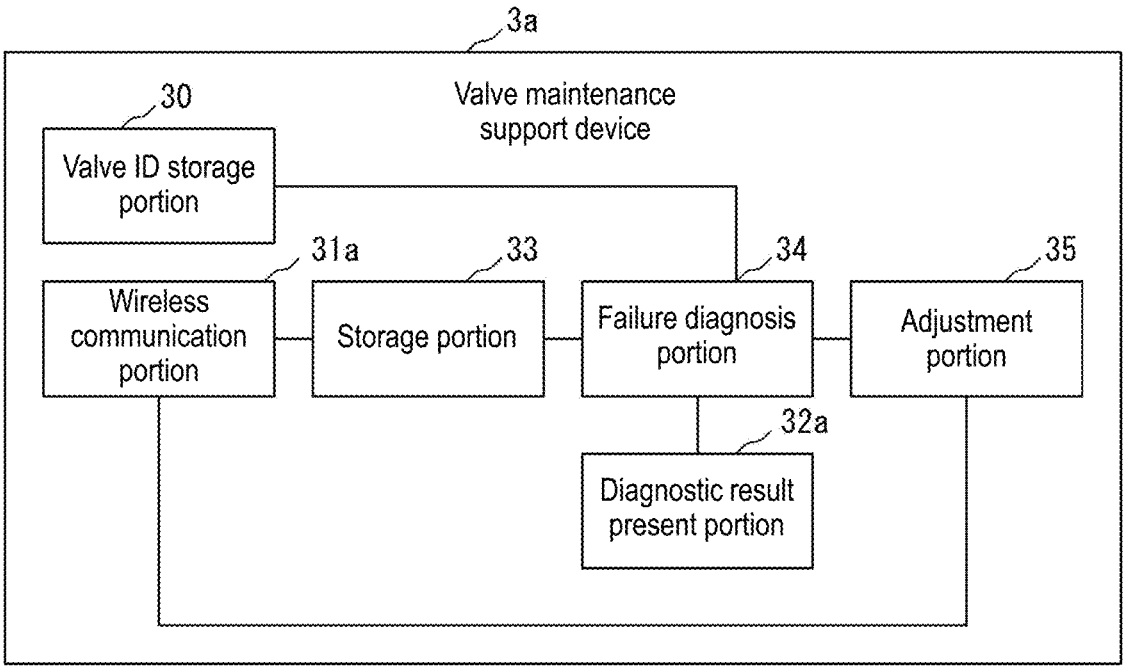
FIG. 12 is a block diagram showing the configuration of the valve maintenance support device of the valve maintenance support system according to the second embodiment of the disclosure.

FIG. 12 is a block diagram showing the configuration of the valve maintenance support device 3a of the valve maintenance support system according to this embodiment. The valve maintenance support device 3a includes a valve ID storage portion 30, a wireless communication portion 31a, a diagnostic result present portion 32a, a storage portion 33, a failure diagnosis portion 34, and an adjustment portion 35.

In the first embodiment, although the failure diagnosis portion 15 and the adjustment portion 16 are implemented in the wireless opening meter 1, if the purpose is to reduce battery consumption, it is preferable to implement configurations and processes that do not need to be implemented in the wireless opening meter externally. Thus, in this embodiment, the failure diagnosis portion 34 and the adjustment portion 35 are implemented in the valve maintenance support device 3a.

Figure 13:
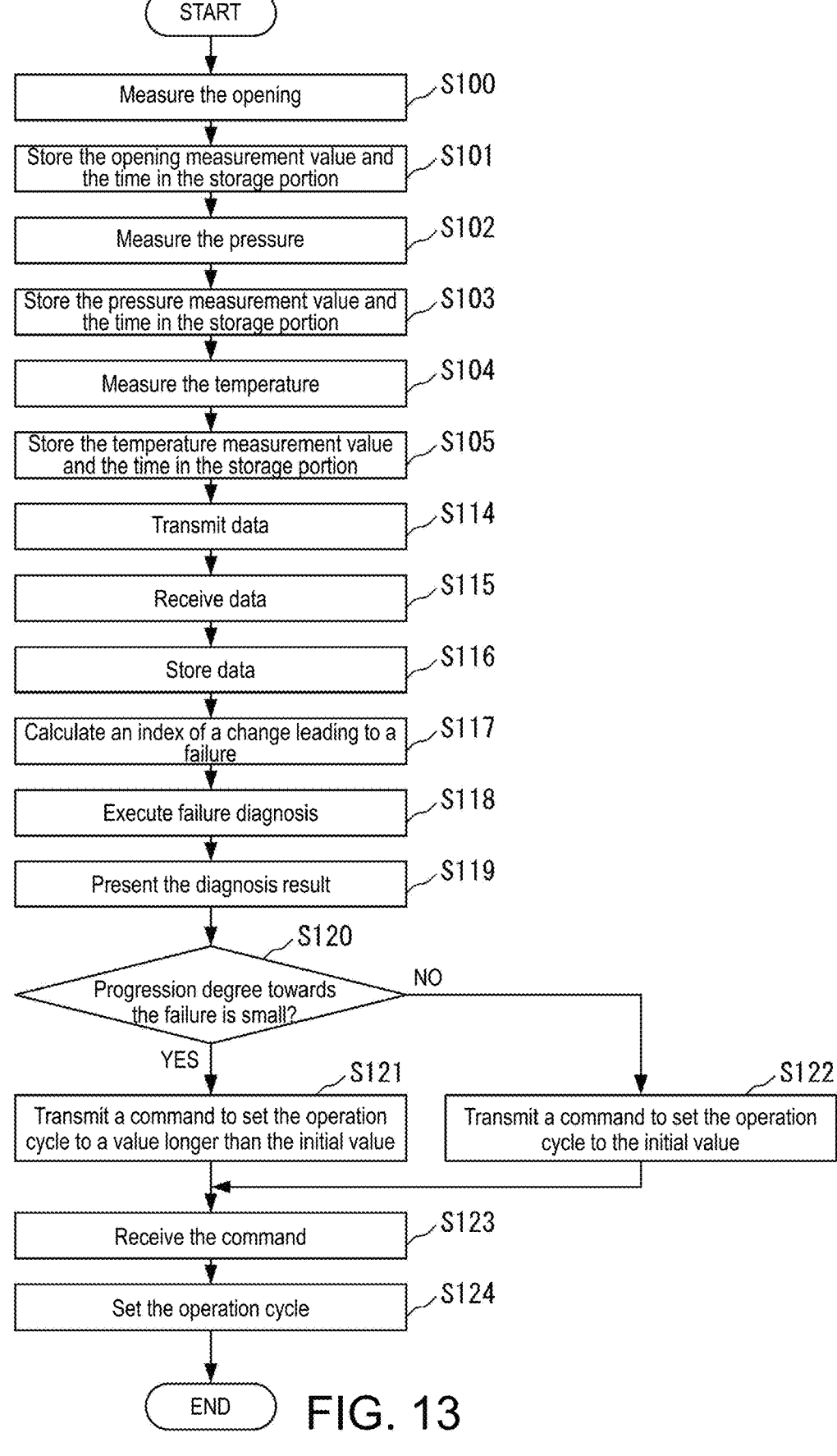
FIG. 13 is a flowchart describing the operation of the valve maintenance support system related to the second embodiment of the disclosure.

FIG. 13 is a flowchart describing the operation of the valve maintenance support system of this embodiment. The processes in steps S100 to S105 in FIG. 13 are as described in the first embodiment.

The wireless communication portion 17a of each wireless opening meter 1a wirelessly transmits data including the valve ID stored in its own valve ID storage portion 10, the opening measurement value, the pressure measurement value, and the temperature measurement value to the valve maintenance support device 3a (FIG. 13, step S114). As mentioned above, time information is added to each of the opening measurement value, pressure measurement value, and temperature measurement value.

The wireless communication portion 31a of the valve maintenance support device 3a receives the data transmitted from each wireless opening meter 1a (FIG. 13, step S115). The data received by the wireless communication portion 31a is stored in the storage portion 33 (FIG. 13, step S116).

The failure diagnosis portion 34 of the valve maintenance support device 3a calculates an index of a change leading to a failure of the control valve based on at least one of the time series data of opening measurement values, time series data of pressure measurement values, and time series data of temperature measurement values for each valve ID (for each valve ID included in the received data) stored in its own valve ID storage portion 30 (FIG. 13, step S117), and executes failure diagnosis of the control valve for each valve ID based on the index (FIG. 13, step S118). The method of calculating the index and the method of failure diagnosis are the same as in the first embodiment.

The diagnostic result present portion 32a of the valve maintenance support device 3a presents the index of the change leading to a failure and the results of the failure diagnosis to the operator for each valve ID (for each valve ID included in the received data) stored in the valve ID storage portion 30 (FIG. 13, step S119).

Next, the adjustment portion 35 of the valve maintenance support device 3a, similar to the adjustment portion 16 in the first embodiment, compares the index of the change leading to a failure with a predetermined index determination threshold, and determines whether the progression degree towards failure of the control valve is small or not for each valve ID (for each valve ID included in the received data) stored in the valve ID storage portion 30 (FIG. 13, step S120).

The adjustment portion 35, in response to determining that the progression degree towards failure of the control valve is small, determines that thinning processing of the operation time of the wireless opening meter 1a should be performed, and generates a command to set the operation cycle of the wireless opening meter 1a to a value longer than the initial value. Further, the adjustment portion 35, in response to determining that the progression degree towards failure of the control valve is large, determines that the thinning processing of the operation time of the wireless opening meter 1a should be terminated, and generates a command to set the operation cycle of the wireless opening meter 1a to the initial value.

The wireless communication portion 31a of the valve maintenance support device 3a, in the case where there exists a wireless opening meter 1a that the adjustment portion 35 has determined should undergo thinning processing of the operation time, wirelessly transmits a command to this wireless opening meter 1a to set the operation cycle to a value longer than the initial value (FIG. 13, step S121). Further, the wireless communication portion 31a, in the case where there exists a wireless opening meter 1a that the adjustment portion 35 has determined should terminate the thinning processing of the operation time, wirelessly transmits a command to this wireless opening meter 1a to set the operation cycle to the initial value (FIG. 13, step S122).

The wireless communication portion 17a of each wireless opening meter 1a receives the command transmitted from the valve maintenance support device 3a (FIG. 13, step S123). The controller 18a of each wireless opening meter 1a sets the operation cycle (in this embodiment, the data transmission cycle of the wireless communication portion 17a) of its own device according to the command received by its wireless communication portion 17a (FIG. 13, step S124). The processing of steps S114 to S124 is performed for each operation cycle of the wireless opening meter 1a.

Thus, in this embodiment, effects similar to those of the first embodiment may be obtained. The index determination threshold for simultaneously observing the progress of a plurality of types of failures may be set in the same manner as in the first embodiment. Similar to the first embodiment, in the case of simultaneously observing the progress of a plurality of types of failures, the adjustment portion 35, in response to obtaining a determination result indicating that the progression degree is small for all failures of the same control valve, determines that thinning processing of the operation time of the wireless opening meter 1a attached to this control valve should be performed. Further, the adjustment portion 35, in response to obtaining a determination result indicating that the progression degree is large for at least one failure of the same control valve, determines that the thinning processing of the operation time of the wireless opening meter 1a attached to this control valve should be terminated.

Figure 14:
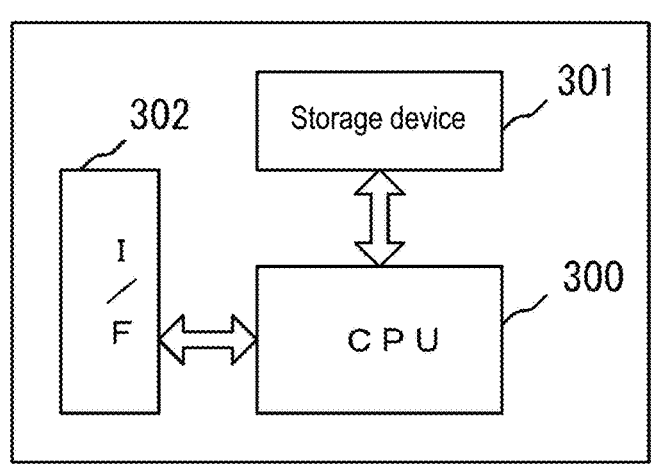
FIG. 14 is a block diagram showing an example configuration of a computer that implements the valve maintenance support system according to the first and second embodiments of the disclosure.
Figure 15:
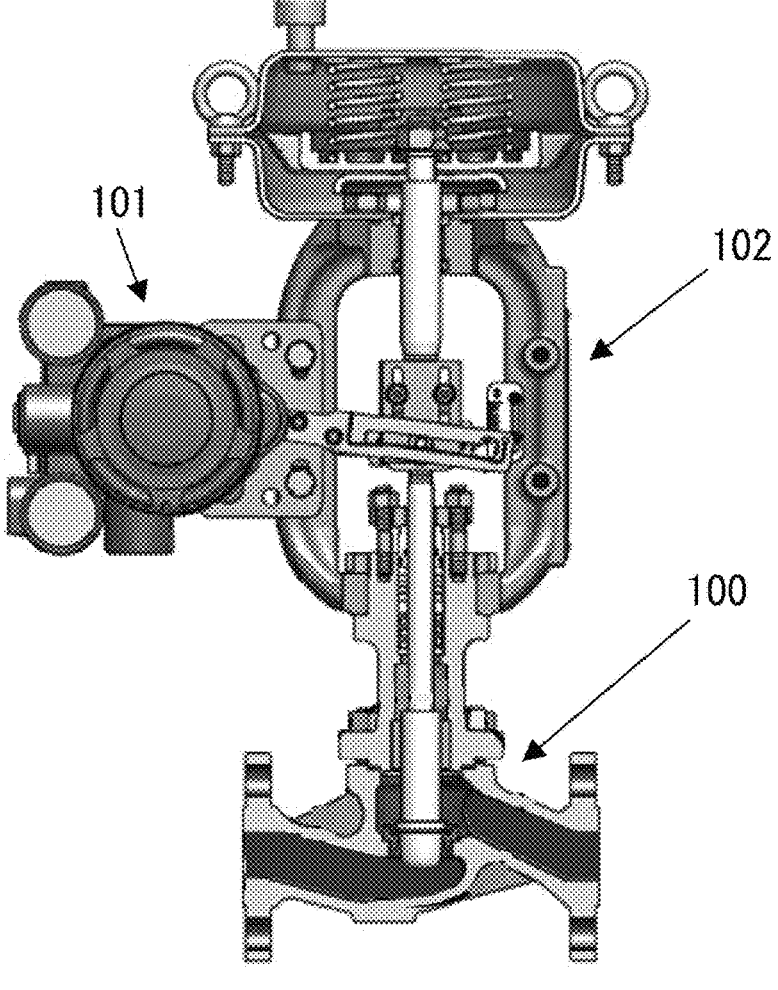
FIG. 15 is a diagram showing an example of the control valve.

The valve ID storage portion 10, the storage portion 14, the failure diagnosis portion 15, the adjustment portion 16, the wireless communication portions 17 and 17a, and the controllers 18 and 18a of the wireless opening meters 1 and 1a described in the first and second embodiments may be implemented by a computer provided with a CPU (Central Processing Unit), storage device, and interface, along with a program that controls these hardware resources. Similarly, the valve maintenance support devices 3 and 3a may be implemented by a computer. An example configuration of these computers is shown in FIG. 14.

The computer includes a CPU 300, a storage device 301, and an interface device (abbreviated as I/F) 302. In the case of the wireless opening meters 1 and 1a, hardware such as the opening measurement portion 11, the pressure measurement portion 12, the temperature measurement portion 13, and the wireless communication portions 17 and 17a are connected to the I/F 302. In the case of the valve maintenance support devices 3 and 3a, hardware of the wireless communication portions 31 and 31a and devices such as display devices are connected to the I/F 302. In such a computer, the program for implementing the valve maintenance support method of the disclosure is stored in the storage device 301. The CPU 300 of each device executes the processing described in the first and second embodiments according to the program stored in the storage device 301 of its own device.

What is claimed is:

1. A wireless opening meter, which is a battery-powered type wireless opening meter attached to a control valve, comprising:

a measurement portion, configured to measure at least one of an opening of the control valve, a pneumatic pressure supplied to an operation device of the control valve, and a temperature at an outlet side of the control valve;

a failure diagnosis portion, configured to calculate an index of a change leading to a failure of the control valve based on a measurement value obtained by the measurement portion, and to execute failure diagnosis of the control valve based on the index;

a wireless communication portion, configured to wirelessly transmit the index and a result of the failure diagnosis to a valve maintenance support device; and an adjustment portion, configured to compare the index with a predetermined index determination threshold, and in response to determining that a progression degree towards a failure of the control valve is small, perform thinning processing of an operation time of a wireless opening meter by extending an operation cycle of a wireless opening meter to be longer than an initial value, and in response to determining that the progression degree is large, set the operation cycle to the initial value to stop the thinning processing.

2. The wireless opening meter according to claim 1, wherein a failure of the control valve targeted for the failure diagnosis is a gradually progressing failure specific to the control valve.

3. The wireless opening meter according to claim 1, wherein in a case of simultaneously observing a progress of a plurality of types of failures of the control valve, the index determination thresholds corresponding to the plurality of types of failures are preset respectively such that periods from when the thinning processing is stopped based on a comparison between the index and the index determination threshold until a failure is detected are equivalent for the plurality of types of failures.

4. A valve maintenance support system comprising:

a battery-powered type wireless opening meter attached to a control valve; and a valve maintenance support device, wherein the wireless opening meter comprises:

a measurement portion, configured to measure at least one of an opening of the control valve, a pneumatic pressure supplied to an operation device of the control valve, and a temperature at an outlet side of the control valve;

a failure diagnosis portion, configured to calculate an index of a change leading to a failure of the control valve based on a measurement value obtained by the measurement portion, and to execute failure diagnosis of the control valve based on the index;

a first wireless communication portion, configured to wirelessly transmit the index and a result of the failure diagnosis to the valve maintenance support device; and an adjustment portion, configured to compare the index with a predetermined index determination threshold, and in response to determining that a progression degree towards a failure of the control valve is small, perform thinning processing of an operation time of the wireless opening meter by extending an operation cycle of the wireless opening meter to be longer than an initial value, and in response to determining that the progression degree is large, set the operation cycle to the initial value to stop the thinning processing, and the valve maintenance support device comprises:

a second wireless communication portion, configured to receive the index and a result of the failure diagnosis transmitted from the wireless opening meter; and a diagnostic result present portion, configured to present the index and a result of the failure diagnosis received by the second wireless communication portion.

5. A valve maintenance support system comprising:

a battery-powered type wireless opening meter attached to a control valve; and a valve maintenance support device, wherein the wireless opening meter comprises:

a measurement portion, configured to measure at least one of an opening of the control valve, a pneumatic pressure supplied to an operation device of the control valve, and a temperature at an outlet side of the control valve;

a first wireless communication portion, configured to wirelessly transmit a measurement value obtained by the measurement portion to the valve maintenance support device, and to receive a command wirelessly transmitted from the valve maintenance support device; and a controller, configured to set an operation cycle of the wireless opening meter in response to the command, the valve maintenance support device comprises:

a second wireless communication portion, configured to receive the measurement value transmitted from the wireless opening meter;

a failure diagnosis portion, configured to calculate an index of a change leading to a failure of the control valve based on the measurement value received by the second wireless communication portion, and to execute failure diagnosis of the control valve based on the index;

a diagnostic result present portion, configured to present the index and a result of the failure diagnosis; and an adjustment portion, configured to compare the index with a predetermined index determination threshold, and in response to determining that a progression degree towards a failure of the control valve is small, perform thinning processing of an operation time of the wireless opening meter by generating a command to set an operation cycle of the wireless opening meter to a value longer than an initial value, and in response to determining that the progression degree is large, stop the thinning processing by generating a command to set the operation cycle to the initial value, and the second wireless communication portion is configured to wirelessly transmit a command generated by the adjustment portion to the wireless opening meter.

6. The valve maintenance support system according to claim 4, wherein a failure of the control valve targeted for the failure diagnosis is a gradually progressing failure specific to the control valve.

7. The valve maintenance support system according to claim 5, wherein a failure of the control valve targeted for the failure diagnosis is a gradually progressing failure specific to the control valve.

8. The valve maintenance support system according to claim 4, wherein in a case of simultaneously observing a progress of a plurality of types of failures of the control valve, the index determination thresholds corresponding to the plurality of types of failures are preset respectively such that periods from when the thinning processing is stopped based on a comparison between the index and the index determination threshold until a failure is detected are equivalent for the plurality of types of failures.

9. The valve maintenance support system according to claim 5, wherein in a case of simultaneously observing a progress of a plurality of types of failures of the control valve, the index determination thresholds corresponding to the plurality of types of failures are preset respectively such that periods from when the thinning processing is stopped based on a comparison between the index and the index determination threshold until a failure is detected are equivalent for the plurality of types of failures.

10. The valve maintenance support system according to claim 6, wherein a failure of the control valve targeted for the failure diagnosis includes at least one of stick-slip, deterioration of V-packing, deterioration of diaphragm of operation device, deterioration of diaphragm of valve body, deterioration of parts due to heat cycle, damage of bellows seal, and rupture of bellows seal.

11. A valve maintenance support method comprising:

a first step in which a battery-powered type wireless opening meter attached to a control valve measures at least one of an opening of the control valve, a pneumatic pressure supplied to an operation device of the control valve, and a temperature at an outlet side of the control valve;

a second step in which the wireless opening meter calculates an index of a change leading to a failure of the control valve based on a measurement value obtained in the first step;

a third step in which the wireless opening meter executes failure diagnosis of the control valve based on the index;

a fourth step in which the wireless opening meter wirelessly transmits the index and a result of the failure diagnosis to a valve maintenance support device;

a fifth step in which the wireless opening meter compares the index with a predetermined index determination threshold, and in response to determining that a progression degree towards a failure of the control valve is small, performs thinning processing of an operation time by extending an operation cycle of the wireless opening meter to be longer than an initial value; and a sixth step in which the wireless opening meter compares the index with the index determination threshold, and in response to determining that the progression degree is large, sets the operation cycle to the initial value to stop the thinning processing.

12. A valve maintenance support method comprising:

a first step in which a battery-powered type wireless opening meter attached to a control valve measures at least one of an opening of the control valve, a pneumatic pressure supplied to an operation device of the control valve, and a temperature at an outlet side of the control valve;

a second step in which the wireless opening meter calculates an index of a change leading to a failure of the control valve based on a measurement value obtained in the first step;

a third step in which the wireless opening meter executes failure diagnosis of the control valve based on the index;

a fourth step in which the wireless opening meter wirelessly transmits the index and a result of the failure diagnosis to a valve maintenance support device;

a fifth step in which the valve maintenance support device receives the index and a result of the failure diagnosis transmitted from the wireless opening meter;

a sixth step in which the valve maintenance support device presents the index and a result of the failure diagnosis received in the fifth step;

a seventh step in which the wireless opening meter compares the index with a predetermined index determination threshold, and in response to determining that a progression degree towards a failure of the control valve is small, performs thinning processing of an operation time by extending an operation cycle of the wireless opening meter to be longer than an initial value; and an eighth step in which the wireless opening meter compares the index with the index determination threshold, and in response to determining that the progression degree is large, sets the operation cycle to the initial value to stop the thinning processing.

13. A valve maintenance support method comprising:

a first step in which a battery-powered type wireless opening meter attached to a control valve measures at least one of an opening of the control valve, a pneumatic pressure supplied to an operation device of the control valve, and a temperature at an outlet side of the control valve;

a second step in which the wireless opening meter wirelessly transmits a measurement value obtained in the first step to a valve maintenance support device;

a third step in which the valve maintenance support device receives the measurement value transmitted from the wireless opening meter;

a fourth step in which the valve maintenance support device calculates an index of a change leading to a failure of the control valve based on the measurement value received in the third step;

a fifth step in which the valve maintenance support device executes failure diagnosis of the control valve based on the index;

a sixth step in which the valve maintenance support device presents the index and a result of the failure diagnosis;

a seventh step in which the valve maintenance support device compares the index with a predetermined index determination threshold, and in response to determining that a progression degree towards a failure of the control valve is small, performs thinning processing of an operation time of the wireless opening meter by generating a command to set an operation cycle of the wireless opening meter to a value longer than an initial value;

an eighth step in which the valve maintenance support device compares the index with the index determination threshold, and in response to determining that the progression degree is large, stops the thinning processing by generating a command to set the operation cycle to the initial value;

a ninth step in which the valve maintenance support device wirelessly transmits the command generated in the seventh step or the eighth step to the wireless opening meter;

a tenth step in which the wireless opening meter receives the command; and an eleventh step in which the wireless opening meter sets an operation cycle of the wireless opening meter according to the command received in the tenth step.

* * * * *